United States Patent
Klatt et al.

(10) Patent No.: US 9,079,343 B2
(45) Date of Patent: Jul. 14, 2015

(54) METHOD AND APPARATUS FOR BLOW MOLDING AND FOR FILLING CONTAINERS

(75) Inventors: Dieter Klatt, Hamburg (DE); Dieter Jenzen, Uetersen (DE); Jan Fabian Meyer, Hamburg (DE)

(73) Assignee: KHS CORPOPLAST GMBH, Hamburg (DE)

( * ) Notice: Subject to any disclaimer, the term of this patent is extended or adjusted under 35 U.S.C. 154(b) by 651 days.

(21) Appl. No.: 13/264,286

(22) PCT Filed: Mar. 29, 2010

(86) PCT No.: PCT/DE2010/000388
§ 371 (c)(1),
(2), (4) Date: Mar. 8, 2012

(87) PCT Pub. No.: WO2010/130236
PCT Pub. Date: Nov. 18, 2010

(65) Prior Publication Data
US 2012/0161372 A1    Jun. 28, 2012

(30) Foreign Application Priority Data
May 11, 2009    (DE) .......................... 10 2009 021 277

(51) Int. Cl.
| | |
|---|---|
| B29C 39/02 | (2006.01) |
| B29C 49/42 | (2006.01) |
| B29C 49/36 | (2006.01) |
| B65G 47/86 | (2006.01) |
| B29C 49/12 | (2006.01) |

(Continued)

(52) U.S. Cl.
CPC .............. B29C 49/421 (2013.01); B29C 49/36 (2013.01); B65G 47/847 (2013.01); *B29C 49/12* (2013.01); *B29C 49/16* (2013.01); *B29K 2023/12* (2013.01); *B29K 2067/00* (2013.01)

(58) Field of Classification Search
USPC ................................... 264/523, 524, 454, 534
See application file for complete search history.

(56) References Cited

U.S. PATENT DOCUMENTS

| | | | |
|---|---|---|---|
| 4,076,071 | A | 2/1978 | Rosenkranz et al. |
| 5,346,386 | A | 9/1994 | Albrecht et al. |

(Continued)

FOREIGN PATENT DOCUMENTS

| | | |
|---|---|---|
| CN | 1177316 A | 3/1998 |
| DE | 2352926 | 4/1975 |

(Continued)

*Primary Examiner* — Stella Yi
(74) *Attorney, Agent, or Firm* — Lucas & Mercanti, LLP; Klaus P. Stoffel

(57) ABSTRACT

The method and the apparatus are used for blow molding and for filling containers. To this end, after a thermal conditioning step, a preform is shaped into a container using blowing pressure inside a blow molding tool. The blow molded containers are positioned at least along part of the transport path thereof by a carrying element, which is held by a rotating transfer wheel. The transfer wheel provides at least part of a coupling between a blow molding module for producing the containers and a filling module for filling the containers. An outfeed wheel of the blow molding module can be arranged in a transport direction of the containers upstream of the transfer wheel, and an infeed wheel of the filling module can be arranged in said transport direction downstream of the transfer wheel, wherein each wheel can be equipped with carrying elements for the containers. The number of carrying elements (42) in the region of the transfer wheel (41) is varied in accordance with a production speed.

9 Claims, 6 Drawing Sheets

(51) Int. Cl.
  *B29C 49/16* (2006.01)
  *B29K 23/00* (2006.01)
  *B29K 67/00* (2006.01)

(56) References Cited

U.S. PATENT DOCUMENTS

| | | | |
|---|---|---|---|
| 5,863,571 A | 1/1999 | Santais et al. | |
| 7,681,713 B2 | 3/2010 | Nishi et al. | |
| 8,202,079 B2 | 6/2012 | Litzenberg et al. | |
| 2009/0014284 A1* | 1/2009 | Langlois et al. | 198/803.9 |
| 2009/0274298 A1 | 11/2009 | Schmitt-Lewen et al. | |
| 2011/0121497 A1 | 5/2011 | Borgatti et al. | |

FOREIGN PATENT DOCUMENTS

| | | |
|---|---|---|
| DE | 4212583 | 10/1993 |
| DE | 19906438 | 8/2000 |
| DE | 102006023531 X | 11/2007 |
| EP | 1350612 * | 10/2003 |
| EP | 1350612 X | 10/2003 |
| JP | 2000118704 A | 4/2000 |
| JP | 2008222428 A | 9/2008 |
| JP | 2011520644 A | 7/2011 |
| JP | 2011529408 A | 12/2011 |
| WO | 2008106921 A1 | 9/2008 |

* cited by examiner

METHOD AND APPARATUS FOR BLOW MOLDING AND FOR FILLING CONTAINERS

The present application is a 371 of International application PCT/DE2010/000388, filed Mar. 29, 2010, which claims priority of DE 10 2009 021 277.9, filed May 11, 2009, the priority of these applications is hereby claimed and these applications are incorporated herein by reference.

BACKGROUND OF THE INVENTION

The invention relates to a method for blow molding and for filling containers in which a preform is initially thermally conditioned and subsequently shaped within a blow mold by the influence of blowing pressure into the container, and in which the blow molded containers are positioned by a support element at least along a portion of their conveying path, wherein the support element is supported by a rotating transfer wheel, and wherein the transfer wheel constitutes at least a portion of a coupling between a blow molding module for the manufacture of containers and a filling module for filling containers.

Moreover, the invention relates to an apparatus for blow molding and for filling containers which includes at least one blow molding station with a blow mold and at least one support element for positioning blow molded containers along a transport path, wherein the support element is supported by a rotating transfer wheel, and wherein the transfer wheel constitutes at least a portion of a coupling between a blow molding module for the manufacture of containers and a filling module for filling the containers.

When containers are shaped by the influence of blowing pressure, preforms of a thermoplastic material, for example, preforms of PET (polyethylene terephthalate), are supplied within a blow molding machine to different processing stations. Such a blow molding station typically includes a heating device and a blow molding device in whose area the previously thermally conditioned preform is expanded into a container by a biaxial orientation. The expansion takes place by means of compressed air which is introduced into the preform which is to be expanded. The sequence of such an expansion of the preform with respect to production technology is explained in DE-OS 43 40 291. The introduction of gas which is under the influence of pressure mentioned above further comprises the introduction of compressed gas into the developing container bubble as well as the introduction of compressed gas into the preform at the beginning of the blow molding process.

The basic construction of a blow molding station for shaping containers is described in DE-OS 42 12 583. Possibilities for thermally conditioning the preforms are explained in DE-OS 23 52 926.

Within the apparatus for blow molding, the preforms as well as the blow molded containers can be transported by means of different manipulating devices. Particularly useful has been found the use of transport mandrels onto which the preforms are placed. However, the preforms can also be manipulated by other support devices. The use of gripping tongs for manipulating preforms and the use of spreading mandrels, which for providing support can be inserted into an opening area of the preform, are also among the available constructions.

A manipulation of containers with the use of transfer wheels is described, for example, in DE-OS 199 06 438 in an arrangement of a transfer wheel between a blow molding wheel and a discharge station.

The manipulation of the preforms already described above takes place, on the one hand, in the so called two-stage methods in which the preforms are initially manufactured in a blow molding method, are subsequently subjected to intermediate storage, and are only later conditioned with respect to their temperature and are in this state blown up into a container. On the other hand, an application of the so called single-stage method in which the preforms are suitably thermally conditioned directly after their manufacture according to blow molding technology and a sufficient solidification and are subsequently expanded.

Different embodiments are known in the art with respect to the blow molding stations used. In blow molding stations which are arranged on rotating transport wheels, a book-like opening capability of the mold supports can be found frequently. However, it is also possible to use mold supports which are slidable relative to each other or are guided in different ways. In stationary blow molding stations which are particularly suitable for receiving several cavities for the shaping of containers, typically plates which are arranged parallel relative to each other are used as mold supports.

For the manipulation of the preforms and the manipulation of the blow molded containers, frequently so called transfer wheels are used within the blow molding machine, wherein the transfer wheels are equipped with support elements for the preforms or bottles. In this case, the support elements may act either directly on the preforms or bottles, or may convey separate transport elements which, in turn, directly support the preforms or bottles. For reinforcing the transfer procedures, the support elements are typically mounted so as to be pivotable relative to the transfer wheel. In addition, frequently also a telescoping capability is realized. For predetermining the positions of the support elements, cam controls are used. For this purpose, the support elements are guided with cam rollers past cams which are arranged so as to be stationary.

The blow molding module already mentioned above comprises essentially a rotatable blow molding wheel with blow molding stations; the filling module comprises essentially a rotatable filling wheel with filling stations.

Rotating transfer wheels with support elements are also used in so called block machines to couple a blow molding module to a filling module. In such blocked arrangements, a problem resides in the fact that the filling module predetermines a maximum filling quantity per unit of time. For example, if a blow molding machine for manufacturing containers having a volume of 0.5 liters is coupled to a filling module and both modules are selected in accordance with their productivity while taking into consideration these border conditions, it is not easily possible to retrofit the blow molding machine for the production of containers having a volume of 1 liter and to have the filling module fill these larger containers with an equal number of containers per unit of time.

Also, in this example, it is not easily possible to just have the blow molding wheel of the blow molding machine travel more slowly, because in cam-controlled blow molding machines frequently process-technological parameters, for example, the stretching speed, are derived from the rotation of the blow molding wheel and cannot be easily varied. Therefore, an adjustment of the productivity of the blow molding module and of the filling module relative to each other poses difficulties when processing containers having volumes which differ from each other.

SUMMARY OF THE INVENTION

Therefore, it is the object of the present invention to improve a method of the above-mentioned type in such a way that with a simple mechanical construction, a manufacture and filling of differently sized containers is reinforced.

In accordance with the invention, this object is met by adjusting the number of support elements in the area of the transfer wheel in dependence on a production speed.

In particular, it is provided that, a discharge wheel of the blow molding module is arranged in front of the transfer wheel seen in a transport direction of the containers, and a feeding wheel of the filling module is arranged in this transport direction behind the transfer wheel, wherein the discharge wheel and the feeding wheel are each equipped with support elements for the containers.

A further object of the present invention is to construct a device of the above-mentioned type in which, by a simple constructive expenditure, a manufacture and filling of differently sized containers is reinforced.

In accordance with the invention, this object is met by the number of support elements in the area of the transfer wheel being adjustable in dependence on a production speed.

In particular, it is provided that, a discharge wheel of the blow molding module is arranged in front of the transfer wheel seen in a transport direction of the containers, and a feeding wheel of the filling module is arranged in this transport direction behind the transfer wheel, wherein the discharge wheel and the feeding wheel are each equipped with support elements for the containers.

By arranging the transfer wheel with the changeable number of support elements between the blow molding module and the filling module, it is possible to operate the blow molding module in such a way that containers are not blow molded in every blow molding station used. For example, it is possible to equip only every second blow molding station with expansion molds and to carry out a container manufacture also only in every second blow molding station. Consequently, the transfer wheel takes over, for example, a blow molded container only from every second support element of the discharge wheel of the blow molding module, and transfers these containers without gaps to the corresponding transport elements of the feeding wheel of the filling module.

In the example which has already been mentioned above of a production change of containers having a filling volume of 0.5 liters to containers having a filling volume of 1 liter, the transport elements are operated in the area of the filling module with half the transport speed in order to make available sufficient time for filling the containers with double the filling quantity necessary. In the area of the blow molding module, on the other hand, the blow molding wheel can continue to rotate with the same speed and can ensure that the process-technological parameters are adhered to. Consequently, the transfer wheel compensates the gaps in the sequence of the containers made available by the blow molding module, and ensures an arrangement of the containers without a gap in the area of the filling module.

As already mentioned, the transfer wheel with the changeable number of support elements, for example, a changeable number of tongs, or a changeable number of support arms, can be arranged between a discharge wheel of the blow molding module and a feeding wheel of the filling module. However, it is also possible to arrange the transfer wheel at different locations of the transport path of the containers which extends from the blow molding wheel to the filling wheel. In particular, the transfer wheel can also be arranged in the filling machine and, for example, can transfer the containers directly to the filling wheel.

For carrying out the transfer procedures in a defined manner, it is provided that the support element is moved relative to the transfer wheel upon a rotation of the transfer wheel.

In particular, it has proven advantageous that the support element is pivoted relative to the transfer wheel.

Moreover, it is also possible that the support element is telescoped relative to the transfer wheel.

An exact reproducibility of the movements which have been carried out can be made available by positioning the support element relative to the transfer wheel by means of a cam control.

For adapting the paths of movement of the support elements to different numbers of support elements in the area of the transfer wheel, it is provided that different control cams are used for the support elements at different production speeds. The respective control cams ensure that the respective transfers are carried out reliably even in the case of different numbers of support elements in the area of the transfer wheel and the resulting different spacings of the support elements relative to each other.

A continuous sequence of movements is reinforced in the case that when the production speed is cut in half, the number of support elements in the area of the transfer wheel is cut in half.

Another positioning possibility resides in that the support element is positioned by a servomotor.

DETAILED DESCRIPTION OF THE INVENTION

Figure 1:
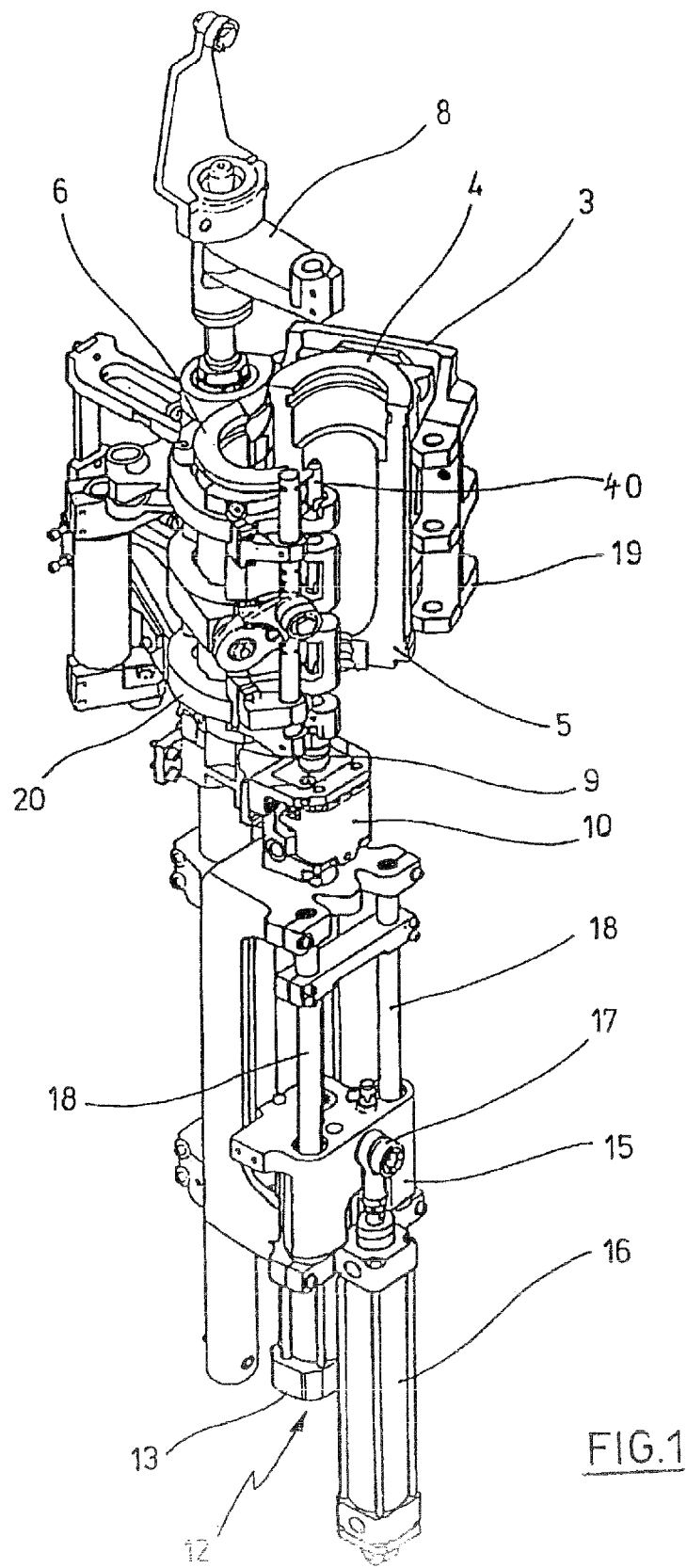
FIG. 1 is a perspective illustration of a blow molding station for manufacturing containers from preforms.
Figure 2:
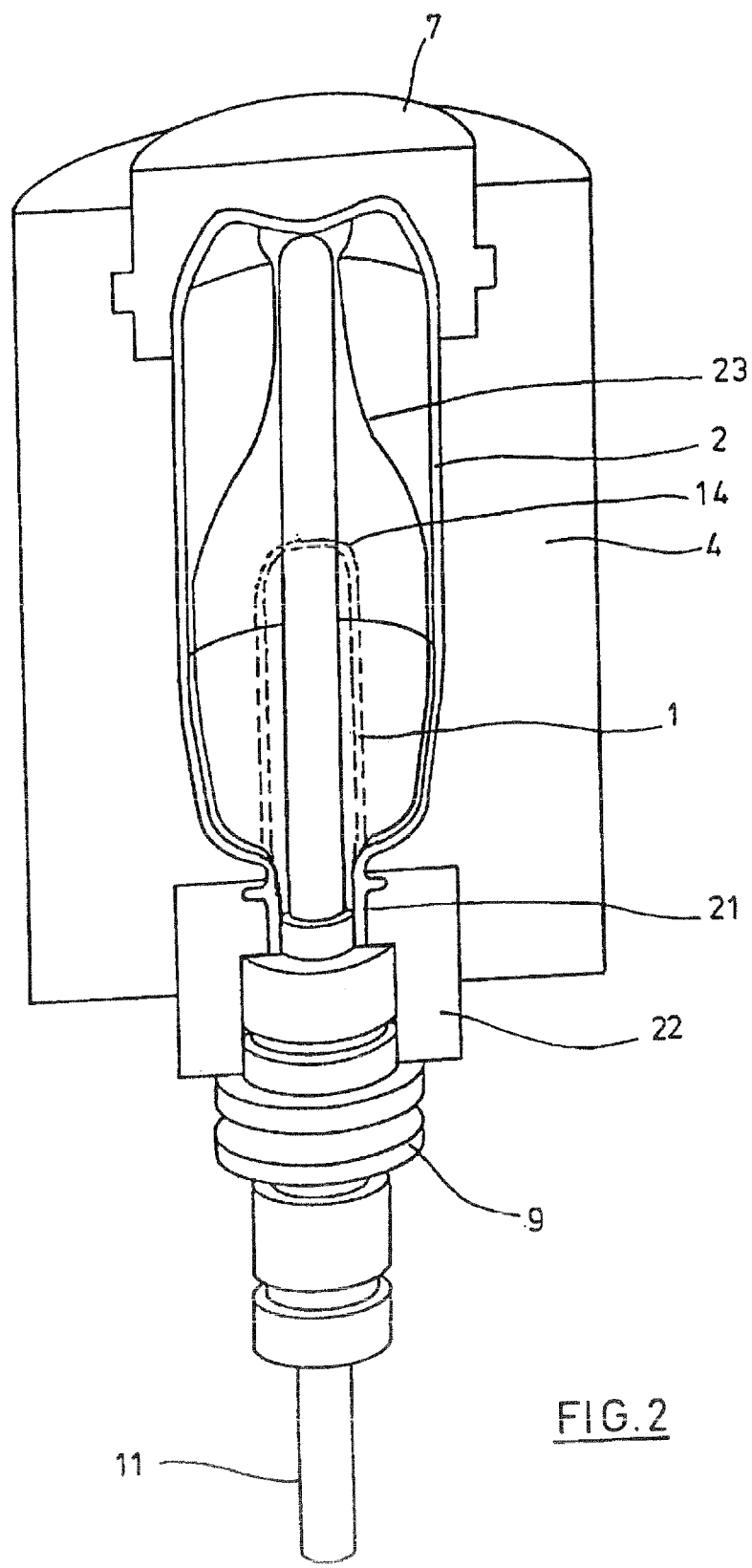
FIG. 2 is a longitudinal sectional view of a blow mold in which a preform is stretched and expanded.

FIG. 1 and FIG. 2 illustrate the principal configuration of an apparatus for shaping preforms 1 into containers 2.

The apparatus for shaping the container 2 consists essentially of a blow molding station 3 which is provided with a blow mold 4 into which a preform 1 can be inserted. The preform 1 may be a continuously cast part of polyethylene terephthalate. For facilitating a placement of the preform 1 into the blow mold 4 and for facilitating a removal of the finished container 2, the blow mold 4 consists of mold halves 5, 6 and a bottom part 7 which can be positioned by a lifting device 8. The preform 1 can be held in the area of the blow molding station 3 by a transport mandrel 9 which together with the preform 1 travels through a plurality of treatment stations within the apparatus. However, it is also possible to place the preform 1, for example, by means of tongs or other manipulation means directly into the blow mold 4.

For facilitating a compressed air supply, a connecting piston 10 is arranged below the transport mandrel 9, wherein the connecting piston 10 supplies the preform 1 with compressed air and simultaneously carries out a sealing action relative to the transport mandrel 9. In accordance with a modified construction it is basically also possible to use fixed compressed air supply lines.

In accordance with this embodiment, stretching of the preform 1 takes place by means of a stretching rod 11 which is positioned by a cylinder 12. In accordance with another embodiment, mechanical positioning of the stretching rod 11 is effected through cam segments which are acted upon by contact rollers. The use of cam segments is particularly suitable if a plurality of blow molding stations 3 are arranged on a rotating blow molding wheel.

In the embodiment illustrated in FIG. 1 the stretching system is constructed in such a way that a tandem arrangement of two cylinders 12 is made available. The stretching rod 11 is initially prior to the beginning of the actual stretching procedure, the stretching rod 11 is moved by a primary cylinder 13 until it is moved into the area of a bottom 14 of the preform 11. During the actual stretching procedure, the primary cylinder 13 is positioned with extended stretching rod together with a carriage 15 supporting the primary cylinder 13 by a secondary cylinder 16 or through a cam control. In particular, it is intended to use the secondary cylinder 16 by means of cam control in such a way that a guide roller 17 which slides while the stretching procedure is carried out along a cam path, predetermines an actual stretching position. The guide roller 17 is pressed by the secondary cylinder 16 against the guide track. The carriage 15 slides along two guide elements 18.

After closing the mold halves 5, 6, arranged in the area of supports 19, 20, the supports 19, 20 are locked relative to each other by means of a locking device 20.

In accordance with FIG. 2, for adapting to different shapes of an opening section 21 of the preform 1, it is intended to use separate threaded inserts 22 in the area of the blow mold 4.

FIG. 2 shows, in addition to the blow molded container 2 also in broken lines the preform 1 and schematically a container bubble 23 which is developing.

Figure 3:
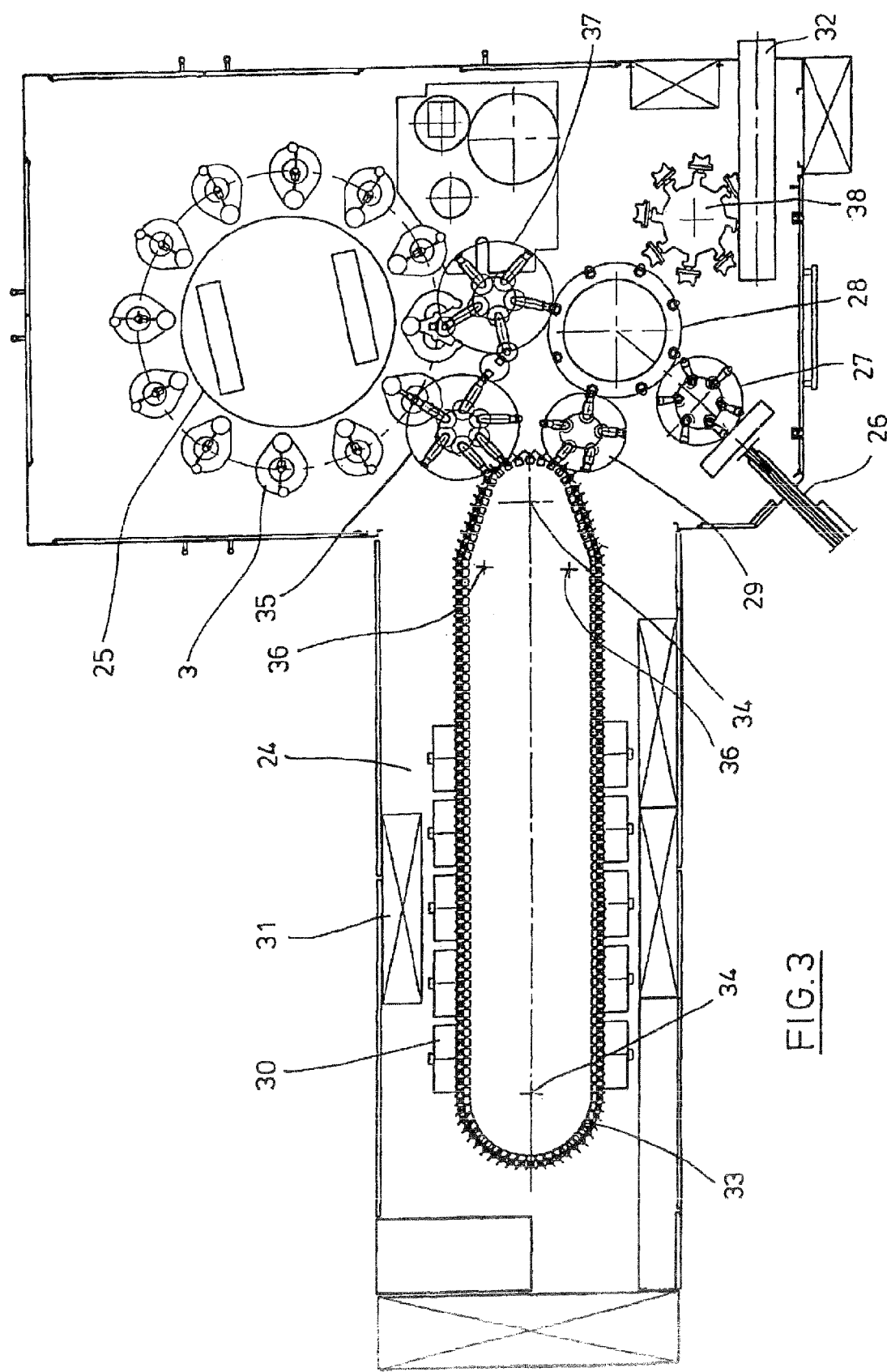
FIG. 3 is a sketch for illustrating a basic construction of an apparatus for blow molding containers.

FIG. 3 shows the basic construction of a blow molding machine which is provided with a heating section 24 as well as a rotating blow molding wheel 25. Starting from a preform input 26, the preforms 1 are transported by transfer wheels 27, 28, 29 into the area of the heating section 24. Arranged along the heating section 24 are heating radiators 30 as well as blowers 31 for thermally conditioning the preforms 1. After the preforms 1 have been sufficiently thermally conditioned, they are transferred to the blow molding wheel 25 in whose area the blow molding stations 3 are arranged. The finished blow molded containers 2 are supplied by additional transfer wheels to a discharge section 32.

In order to be able to shape a preform 1 into a container 2 in such a way that the container 2 has material properties which ensure a long usability of food stuffs filled into the container 2, particularly of beverages, special method steps must be adhered to when heating and orienting the preforms 1. Moreover, advantageous effects can be achieved by adhering to special dimensioning rules.

Different synthetic materials can be used as thermoplastic materials. For example, PET, PEN or PP can be used.

The expansion of the preform 1 during the orientation procedure takes place through the supply of compressed air. The supply of compressed air is divided into a pre-blowing phase, in which gas, for example, compressed air is supplied with a low pressure level, and into a subsequent principal blowing phase in which gas is supplied at a higher pressure level. During the pre-blowing phase, compressed air is typically used with a pressure in the interval of 10 bar to 25 bar, and during the principal blowing phase compressed air is supplied at a pressure in the interval of 25 bar to 40 bar.

From FIG. 3 it can also be seen that in the illustrated embodiment the heating section 24 is constructed of a plurality of circulating transport elements 33 which are arranged in a row in the manner of a chain and are guided along guide wheels 34. It is particularly intended to provide an essentially rectangular contour by the chain-like arrangement. In the illustrated embodiment, in the area of the extension of the heating section 24 facing the transfer wheel 29 and a feeding wheel 35 and in the area of adjacent deflections, two deflection wheels 36 having comparatively smaller dimensions are used. However, any chosen other guide means are also conceivable.

In order to facilitate an arrangement of the transfer wheel 29 and the feeding wheel 35 relative to each other which is as close as possible, the illustrated arrangement has been found particularly useful because in the area of the corresponding extension of the heating section 24, three deflection wheels 34, 36 are positioned, wherein specifically the smaller deflection wheels 36 are positioned in the area of the transition to the linear extensions of the heating section 24 and the larger deflection wheel 34 is positioned in the immediate transfer area to the transfer wheel 29 and to the feeding wheel 35. As an alternative to using chain-like transport elements 33, it is also possible, for example, to use a rotating heating wheel.

After blow molding of the containers 2, the containers are moved by a discharge wheel 37 from the area of the blow molding stations 3 and are transported through the transfer wheel 28 and a discharge wheel 38 to the discharge section 32.

Figure 4:
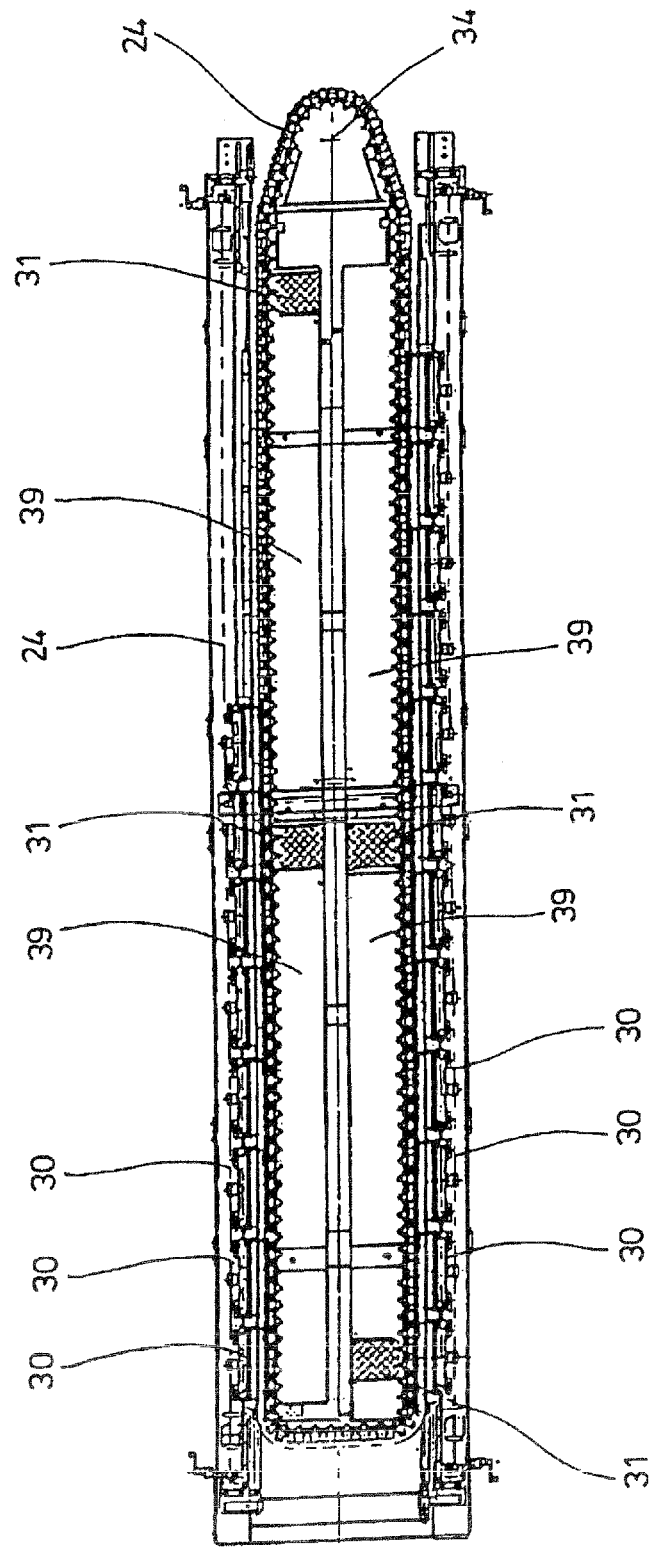
FIG. 4 shows a modified heating section with increased heating capacity.

In the modified heating section 24 illustrated in FIG. 4, it is possible to thermally condition a larger quantity of preforms 1 per unit of time as a result of the greater number of heating radiators 30. The blowers 31 in this case, conduct cooling air into the area of cooling air ducts 39 which are located opposite the corresponding heating radiators 30 and discharge the cooling air through discharge openings. By arranging the discharge directions, a flow direction for the cooling air is realized essentially transversely of a conveying direction of the preforms 1. In the area of the heating radiators 30, the cooling air ducts 39 can make available reflectors for the heating radiation. It is also possible to realize a cooling of the heating radiators 30 through the discharged cooling air.

Figure 5:
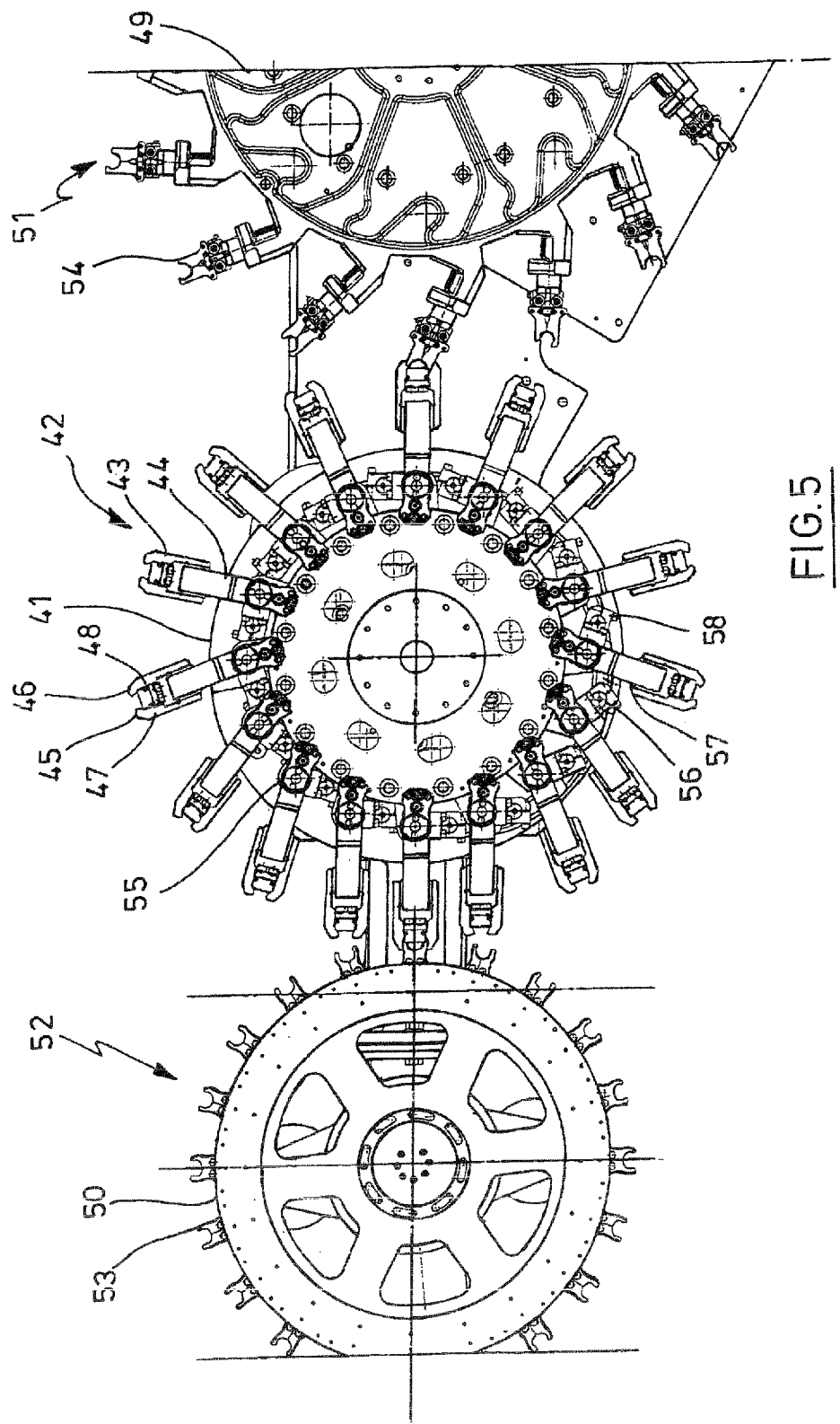
FIG. 5 is a schematic illustration of a transfer wheel arranged between a discharge wheel and a feeding wheel with a complete supply of support elements for the flow molded containers.

FIG. 5 shows a transfer wheel 41 which is provided with support elements 42 which serve for manipulating containers 2. In the illustrated embodiment, the support element 42 is composed of a manipulating element 43 and a support arm 44. In the illustrated embodiment the manipulating element 43 is constructed like tongs and has two tong arms 45, 46 which are supported by the support arm 44 so as to be pivotable relative to the axes of rotation 47, 48. Such manipulating elements 43 directly grasp the containers 2. However, the manipulating elements 43 can also be realized in such a way that a contact with transport elements is provided which, in turn, support the preforms 1 or containers 2. Such a transport element can also be realized, for example, as a support mandrel 9.

The transfer wheel 41 is arranged between a discharge wheel 49 and a feeding wheel 50. The discharge wheel 49 is assigned to a blow molding module 51 and the feeding wheel 50 is assigned to a filling module 52. The feeding wheel 50 has a plurality of support elements 53 and the discharge wheel 49 has a plurality of support elements 54.

In the area of the transfer wheel 41 the support elements 42 are mounted so as to be pivotable relative to the axes 55. A pivoting movement of the support elements 42 is predetermined by using cam rollers 56 which are guided along a cam track 57. For example, the cam rollers 56 can be arranged in the area of a transverse arm 58 of the support arm 44 in order to predetermine pivoting movements in a simple manner.

FIG. 5 shows an embodiment in which a maximum number of support elements 42 are arranged in the area of the transfer wheel 41. In this case, in the event of a rotation of the discharge wheel 49, of the transfer wheel 41 and of the feeding wheel 50, each support element 54 of the discharge wheel 49 transfers a blow molded container to a support element 42 of the transfer wheel 41 and each support element 42 of the transfer wheel 41 transfers a container to a support element 50 of the feeding wheel 50. This state of operation corresponds to a structurally predetermined maximum utilization of the blow molding module 51 as well as of the filling module 52.

Figure 6:
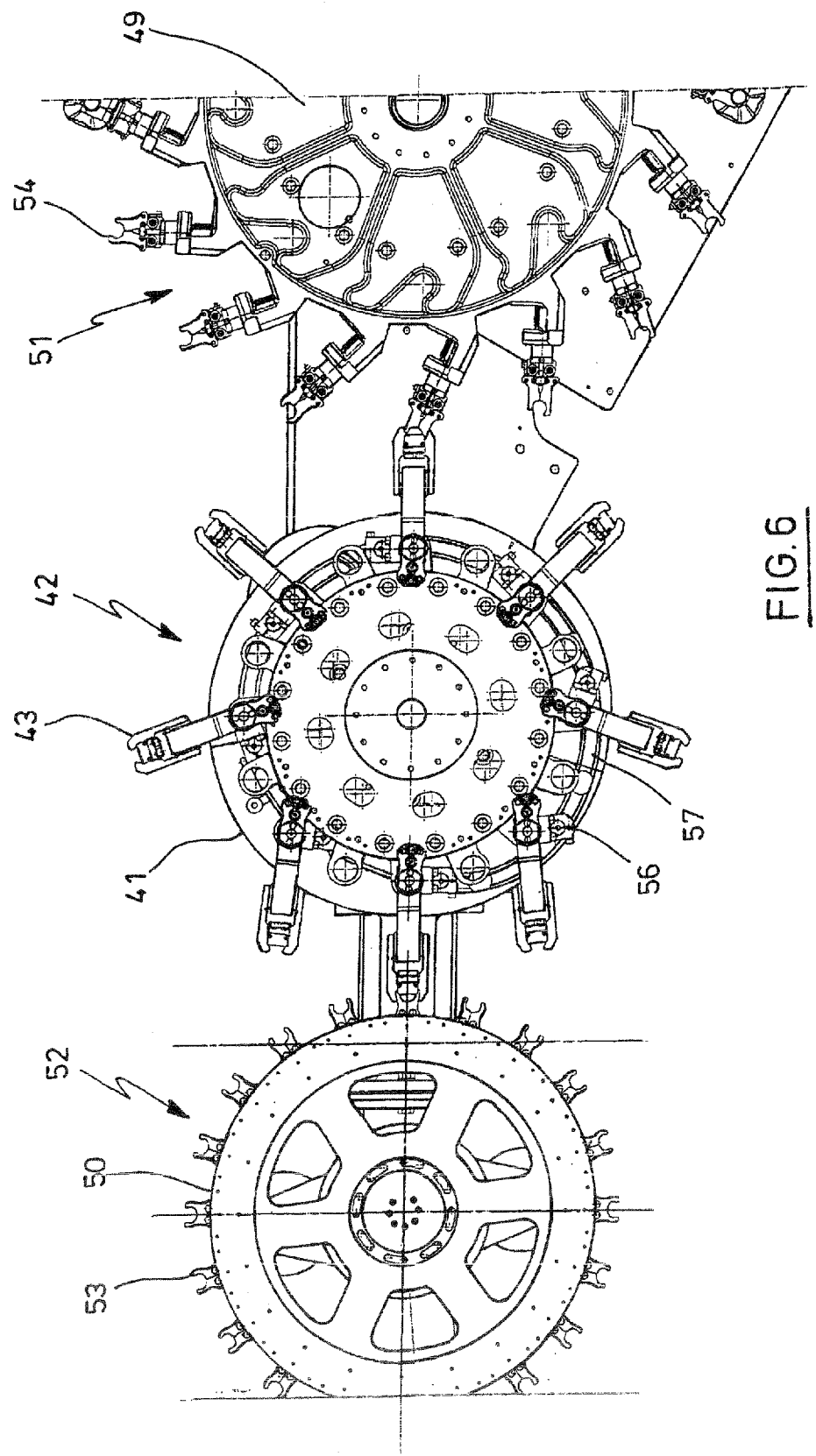
FIG. 6 shows the arrangement according to FIG. 5 after removal of every second support element in the area of the transport wheel.

FIG. 6 shows a state of operation in which the number of support elements 42 in the area of the transfer wheel 41 is cut in half relative to the illustration in FIG. 5. Every second support element 42 has been omitted. In this state of operation the discharge wheel 49 rotates with the same speed as in accordance with FIG. 5, however, only every second support element 54 transports a blow molded container. By an appropriate modification of the cam track 57, a pivoting movement of the support elements 42 is predetermined in such a way that the rate of rotation of the feeding wheel 50 has been cut in half as compared to the embodiment in FIG. 5, each support element 53 of the feeding wheel 50 is loaded with a container. In the area of the filling module 52, this ensures a gap-free sequence of containers.

The invention claimed is:

1. A method for blow molding and for filling containers, comprising the steps of: initially thermally conditioning a preform; subsequently shaping the preform within a blow mold by influence of compressed air in the preform; positioning blow molded containers at least along a portion of a transport path by a support element that is held by a rotating transfer wheel, the transfer wheel making available at least a section of a coupling between a rotating blow molding module for manufacturing containers and a rotating filling module for filling containers; and changing a number of support elements on the transfer wheel by removing support elements from or adding support elements to the transfer wheel in dependence on a production speed when a relative rotational speed of the blow molding module and the filling module is changed.

2. The method according to claim 1, wherein in a transport direction of the containers, in front of the transfer wheel, a discharge wheel of the blow molding module is provided, and in the transport direction following the transfer wheel, a feeding wheel of the filling module is provided, both the discharge wheel and the feeding wheel being equipped with support elements for the containers.

3. The method according to claim 1, including moving the support element relative to the transfer wheel in the event of a rotation of the transfer wheel.

4. The method according to claim 1, including pivoting the support element relative to the transfer wheel.

5. The method according to claim 1, including telescoping the support element relative to the transfer wheel.

6. The method according to claim 1, including positioning the support element relative to the transfer wheel using a cam control.

7. The method according to claim 1, including using different control cams for the support elements in the event of different production speeds.

8. The method according to claim 1, including cutting the number of support elements in the area of the transfer wheel in half when production speed is cut in half.

9. The method according to claim 1, including positioning the support element by a servomotor.

\* \* \* \* \*